United States Patent
Schumann et al.

(10) Patent No.: US 10,351,118 B2
(45) Date of Patent: Jul. 16, 2019

(54) SYSTEM AND METHOD FOR REDUCING BRAKE NOISE IN A VEHICLE USING ELECTRONIC BRAKE SYSTEM

(71) Applicant: Continental Automotive Systems, Inc., Auburn Hills, MI (US)

(72) Inventors: Clinton Lee Schumann, Holly, MI (US); Christopher Allen Harrison, Shelby Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/836,149

(22) Filed: Aug. 26, 2015

(65) Prior Publication Data
US 2017/0057481 A1    Mar. 2, 2017

(51) Int. Cl.
*B60T 8/00* (2006.01)
*B60T 13/74* (2006.01)
*B60T 8/40* (2006.01)
*B60T 13/68* (2006.01)

(52) U.S. Cl.
CPC .......... *B60T 13/745* (2013.01); *B60T 8/4081* (2013.01); *B60T 13/686* (2013.01); *B60T 8/00* (2013.01)

(58) Field of Classification Search
CPC ........ B60T 8/00; B60T 8/345; F16D 65/0006; F16D 65/0012
See application file for complete search history.

(56) References Cited

U.S. PATENT DOCUMENTS

| | | | | |
|---|---|---|---|---|
| 4,647,114 A | * | 3/1987 | Schuett | B60T 8/885 188/349 |
| 4,743,074 A | * | 5/1988 | Inoue | B60T 8/266 188/106 P |
| 5,962,997 A | * | 10/1999 | Maisch | B60T 8/266 188/157 |
| 8,200,406 B2 | * | 6/2012 | Stephenson | B60T 7/042 188/1.11 E |
| 8,265,846 B2 | * | 9/2012 | Kinser | B60T 8/00 303/191 |
| 9,739,323 B2 | * | 8/2017 | Shintani | F16D 65/00 |
| 2002/0123837 A1 | * | 9/2002 | Eccleston | B60T 17/22 701/70 |

(Continued)

FOREIGN PATENT DOCUMENTS

JP       10329681 A   * 12/1998
SU        962040 A2  *  9/1982

*Primary Examiner* — Bradley T King
*Assistant Examiner* — Stephen M Bowes

(57) ABSTRACT

A vehicle brake system has front and rear wheel brakes with each brake including a caliper associated with a rotor. A master cylinder is activated by a brake pedal to which the wheel brakes are connected. An electrically controllable pressure generating device delivers a brake system pressure. A plurality of valves is fluidly coupled between the calipers and the master cylinder. A control unit has a processor circuit to determine if the vehicle is operating under a condition where brake noise can occur and if so, the control unit controls the pressure generating device and certain of the valves to selectively control caliper pressure by supplying pressure or releasing pressure to certain ones of the calipers to reduce the brake noise, while ensuring adequate braking of the vehicle.

15 Claims, 2 Drawing Sheets

(56) References Cited

U.S. PATENT DOCUMENTS

| | | | |
|---|---|---|---|
| 2004/0174067 A1* | 9/2004 | Kamiya | B60T 8/00 303/191 |
| 2004/0183366 A1* | 9/2004 | Kamiya | B60T 8/00 303/11 |
| 2004/0206589 A1* | 10/2004 | Kamiya | B60T 8/345 188/106 P |
| 2004/0222696 A1* | 11/2004 | Kamiya | B60T 8/00 303/191 |
| 2007/0216224 A1* | 9/2007 | Schmitt | F16D 65/0006 303/191 |
| 2008/0173490 A1* | 7/2008 | Itoh | B60T 13/586 180/165 |
| 2011/0291470 A1* | 12/2011 | Drumm | B60T 1/10 303/3 |
| 2013/0093237 A1 | 4/2013 | Dinkel | |
| 2013/0218407 A1 | 8/2013 | Jungbecker et al. | |
| 2014/0028084 A1 | 1/2014 | Biller et al. | |

* cited by examiner

SYSTEM AND METHOD FOR REDUCING BRAKE NOISE IN A VEHICLE USING ELECTRONIC BRAKE SYSTEM

FIELD

The invention relates to a vehicle brake system and, in particular, to a vehicle electronic brake system that reduces brake noise, such as creep groan of the brakes.

BACKGROUND

Brake noise is a common brake complaint. For example, "creep groan" is one such noise that is generally noticeable as a vehicle's brakes are slowly released from a static situation. Creep groan is thought to be caused by the brake lining and rotor transitioning from static to sliding friction or vice versa. This transition is heard and potentially felt by the driver via the brake pedal and steering wheel. Other brake noise occurring at the caliper and rotors may be noticed by the driver.

Thus, there is a need to provide a vehicle electronic brake system that reduces brake noise.

SUMMARY

An objective of the invention is to fulfill the need referred to above. In accordance with the principles of the present invention, this objective is obtained by providing a vehicle brake system for a vehicle having front and rear wheel brakes. Each brake includes a caliper associated with a rotor. The system includes a master cylinder constructed and arranged to be activated by a brake pedal to which the wheel brakes are connected. An electrically controllable pressure generating device is constructed and arranged to deliver a brake system pressure. A plurality of valves is fluidly coupled between the calipers and the master cylinder. A control unit has a processor circuit that is constructed and arranged to determine if the vehicle is operating under a condition where brake noise can occur. When the vehicle is determined by the processor circuit to be operating under a condition where brake noise can occur and when the brake pedal is actuated, the control unit is constructed and arranged to control the pressure generating device and certain of the valves to selectively modulate caliper pressure by supplying pressure or releasing pressure to certain ones of the calipers to reduce the brake noise, while ensuring adequate braking of the vehicle.

In accordance with another aspect of a disclosed embodiment, a method is provided for reducing brake noise in a vehicle brake system having front and rear wheel brakes, a master cylinder activated by a brake pedal to which the wheel brakes are connected, an electrically controllable pressure generating device constructed and arranged to deliver a brake system pressure, and a plurality of valves fluidly coupled between the calipers and the master cylinder. The method determines if the vehicle is operating under a condition where brake noise can occur. When the vehicle is determined to be operating under a condition where brake noise can occur and when the brake pedal is actuated by a driver of the vehicle, the pressure generating device and certain of the valves are controlled to selectively modulate caliper pressure by supplying pressure or releasing pressure to certain ones of the calipers to reduce the brake noise, while ensuring adequate braking of the vehicle.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
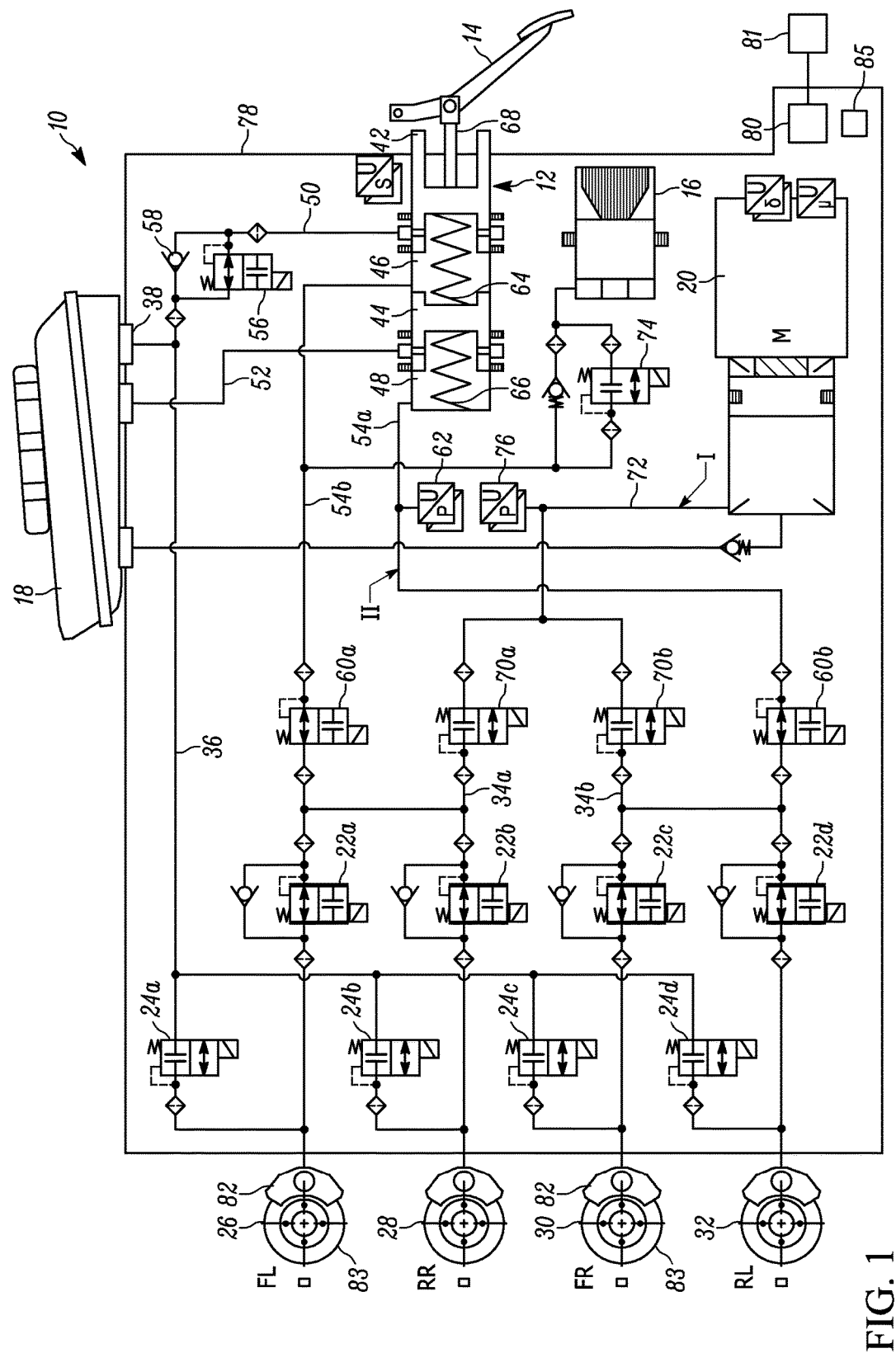
FIG. 1 is a schematic view of an electronic brake system for reducing brake noise such as creep groan in accordance with an embodiment.

With reference to FIG. 1, a vehicle electronic brake system is shown, generally indicated at 10, in accordance with an embodiment. The brake system can be of the type disclosed in Patent Application Publication No. US 2014/0028084 A1, the content of which is hereby incorporated into this specification by reference. Thus, the brake system 10 includes of a hydraulic tandem master cylinder, generally indicated at 12, which can be actuated by means of an actuating or brake pedal 14.

A pressure medium reservoir 18 is associated with the tandem master cylinder 12. An electrically controllable pressure generating device 20, preferably in the form of a linear actuator having a hydraulic piston-cylinder assembly, is fluidly coupled with electrically controllable pressure modulation inlet valves 22a-22d and outlet valves 24a-24d, which are connected together hydraulically in pairs via center connections to which wheel brakes 26, 28, 30, and 32 of a motor vehicle (not shown). The inlet connections of the inlet valves 22a-22d are supplied in pairs with two pressures, referred to as modulator admission pressures, by means of modulator admission pressure lines 34a, 34b, while the outlet connections of the outlet valves 24a-24d are connected to a low-pressure hydraulic accumulator 38.

As is also apparent from FIG. 1, the tandem master cylinder 12 of the brake system according to the embodiment includes two hydraulic pistons 42, 44 arranged one behind the other which delimit hydraulic chambers or pressure chambers 46, 48. The pressure chambers 46, 48 are connected on the one hand via radial bores formed in the pistons 42, 44 and corresponding pressure compensation lines 50, 52 to the pressure medium reservoir 18 with the bores being blockable by relative movement of the pistons 42, 44 and, on the other hand, by means of hydraulic lines 54a, 54b to the aforementioned pressure lines 34a, 34b. The hydraulic lines 54a, 54b and the pressure lines 34a, 34b form part of a respective brake circuit in each case, denoted by references I and II.

A parallel connection of a currentlessly open (normally open—NO) diagnostic valve 56 with a non-return (check) valve 58, which closes towards the pressure medium reservoir 18, is contained in the pressure compensation line 50. Isolation valves 60a, 60b are connected between the hydraulic lines 54a, 54b and the pressure lines 34a, 34b and are in the form of electrically operated, preferably currentlessly open (normally open—NO) 2/2-way valves which enable the brake master cylinder pressure chambers 46, 48 to be isolated from the pressure lines 34*a*, 34*b*. A pressure sensor 62 connected to the pressure chamber 48 or to the hydraulic line 54*a* detects the pressure built up in the pressure chamber 48 by displacement of the second piston 44. In addition, the pressure chambers 46, 48 accommodate returned springs 64, 66 that position the pistons 42, 44 in a starting position when the brake master cylinder is not actuated. A push rod 68 couples the swiveling movement of the brake pedal 14 resulting from a pedal actuation to the translational movement of the first (master cylinder) piston 42, the actuation travel of which is detected by a preferably redundantly implemented travel sensor 16. The corresponding piston travel signal is thus a measure for the brake pedal actuation angle. It represents a braking request of a vehicle driver.

Two electrically operable sequence valves 70*a*, 70*b* are connected on one side to the system pressure line 72, and are connected on the other side to the pressure lines 34*a*, 34*b*. Accordingly, upon activation of the sequence valves 70*a*, 70*b* the system pressure is switched to the brake circuit pressure lines 34*a*, 34*b*. This activation takes place whenever the vehicle driver activates the brake system in the brake-by-wire operating mode, and simultaneously or with a very small time offset after activation of the isolation valves 60*a*, 60*b* and of the simulator release valve 74. The master cylinder 12 and the pedal 14 are therefore uncoupled from the brake circuit pressures in the brake-by-wire operating mode, and connected to a travel simulator 16. The travel simulator 16 is fluidly coupled between the master cylinder 12 and the calipers 82 to provide brake pedal feel to a driver of the vehicle during a brake-by-wire operation of the system 10 and to isolate the calipers from the driver's engagement with the brake pedal. A preferably redundantly implemented pressure sensor 76 is provided to detect the pressure prevailing in the brake circuit I.

As shown in FIG. 1, the components of the brake system 10 are preferably part of a brake system modulator or control unit 78 that includes a processor circuit 80. When the driver brakes (actuates brake pedal 14), the brake fluid travels from the master cylinder 12 to the pedal simulator 16. Then, the pressure generating device 20, as controlled by the control unit 78, will supply the actual braking pressure to the calipers 82 associated with each brake, 26, 28, 30 and 32 to engage the associated rotor 83. The brake system 10 can reduce creep groan by controlling the brake pressure during situations known to cause creep groan. Creep groan is noticeable at static rotor or creeping situations at idle, at low caliper pressures, at first drive off when the brakes are cold, and when the driver is slowly modulating the brake pedal 14. These situations can be sensed by sensors 81 that communicate with the processor circuit 80. The brake system 10 is configured for all situations including high speed stopping where high brake torques are necessary. In FIG. 1, there are some valves (e.g., valve 74) that are energized to provide the path from the master cylinder 12 to the pedal feel simulator 16. These valves are in their "normal" positions in case of a failure. During a failure, the hydraulic path would be from the master cylinder 12 to the calipers 82.

Conventionally, during static and low speed situations, the caliper pressure at all four brakes 26, 28, 30 and 32 are of the same value. With the system 10, the processor circuit 80 can determine via input from at least one sensor 81 if the vehicle is operating in a manner where brake noise such as creep groan is likely and, if so, the control unit 78 controls the amount of pressure at the individual brake appropriately to reduce the brake noise (e.g., creep groan). For example, if the sensor 81 indicate that the front axle brakes 26, 30 are causing creep groan that is audible to the driver and can be felt in the steering wheel and brake pedal 14, the control unit 78 can control the system 10 (e.g., device 20 and input and output valves) to reduce the front axle brake pressure relative to the rear axle brake pressure. This control assumes that the rear brakes 28 and 32 have enough torque to provide the appropriate braking power. If the creep groan is caused by all for axle brakes equally, then half of the nose would be eliminated and the remaining creep groan would not be felt in the steering wheel since the rear brakes are not connected to the steering system. The sensor 81 can include a wheel speed sensor, a noise sensor such as a microphone or other sensors that can determiner brake noise. Alternatively, determination of brake noise can be calibrated based on the vehicle's chassis relative to audible or tactical feel of an engineer and stored in the memory 85. Although the brake noise discussed herein relates to brake creep groan, other brake noise arising from the caliper/rotor interaction can be reduced with the system 10.

Figure 2:
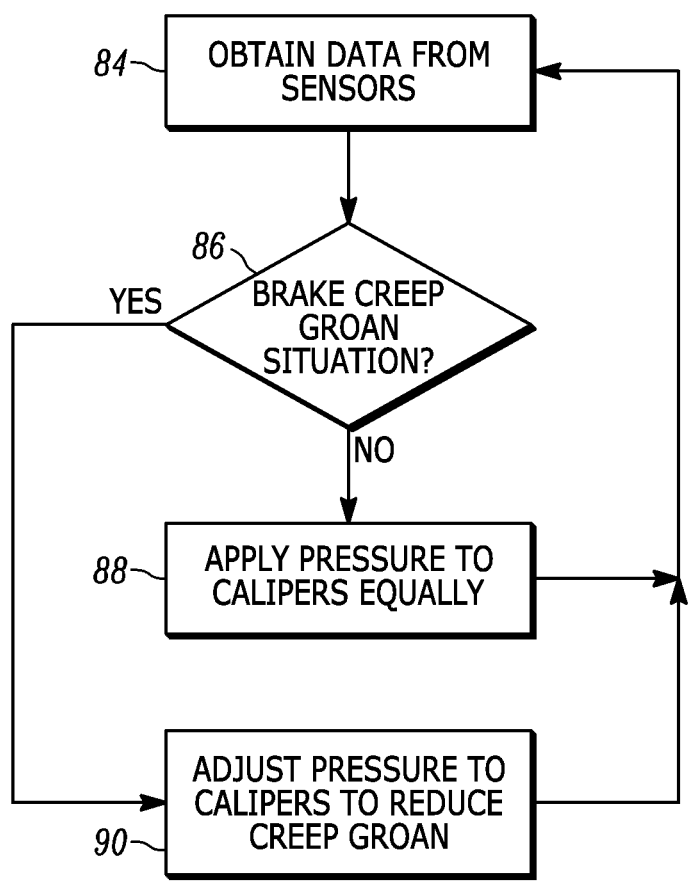
FIG. 2 is a flowchart showing the steps to reduce creep groan using the system of FIG. 1.

FIG. 2 shows the steps or algorithm for reducing brake noise such as brake creep groan according to an embodiment. In step 84, data is obtained from the sensor 81. The data can be vehicle conditions such as, for example, static rotor, idle, low caliper pressures, at first drive off when the brakes are cold, and when the driver is slowly modulating the brake pedal 14. Based on the data, in step 86, the processor circuit 80 determines if the vehicle is operating under a condition when brake creep groan or other brake noise can occur. Instead of using the sensor 81, the processor circuit 80 can access memory circuit 85 to compare the current operating condition of the vehicle with the calibrated noise data stored in the memory circuit 85. If the vehicle is not operating where brake noise can be generated, in step 88, control unit 78 causes the pressure generating device 20 of the system 10 and valves 24*a*-24*d*, 22*a*-22*d*, 60*a*-60*d* to supply each caliper 82 of each brake 26, 28, 30, and 32 with substantially equal brake pressure in the conventional manner. If the processor circuit 80 determines (e.g., based on comparison with calibration data in memory 85) that the vehicle is operating under conditions that can cause creep groan or other brake noise, in step 90, the control unit 78 controls the pressure generating device 20 and the appropriate valves 24*a*-24*d*, 22*a*-22*d*, 60*a*-60*d* to selectively modulate the caliper pressure by supplying pressure or releasing pressure to a pair of the calipers 82 to reduce the creep groan or noise, while ensuring adequate braking of the vehicle. For example, the system 10 can provide pressure to only the front axle calipers, or delay release of the rear axle calipers relative to the release of the front axle calipers, or release one diagonally disposed pair of calipers faster than the other diagonally disposed pair of calipers. Controlling the pressure generating device 20 and the opening and closing of valves 24*a*-24*d*, 22*a*-22*d*, 60*a*-60*d* to control the pressure at calipers 82 will be apparent to one of ordinary skill in the relevant technical field from the disclosed embodiment and therefore is not described in detail herein.

Safety measures can be employed to limit the effects of vehicle movement. For example, the creep groan reduction can be implemented only when the master cylinder pressure is below a certain valve, when the vehicles not on a grade, or can be adjusted based on how fast the driver is applying the brakes, etc.

In vacuum-less braking systems, the implementation of the system 10 for reducing creep groan would be transparent to the driver since in such vacuum-less systems, the brake pedal feel would not change when isolating an axle or wheel brake.

The reduction of brake noise such as creep groan as discussed above can be employed in other brake systems such as a hydraulic vehicle brake system as disclosed in Patent Application Publication No. US 2013/0093237 A1, content of which is hereby incorporated into this specification by reference. In vacuum brake system, the pressure generating device 20 can be a source of vacuum pressure such as a vacuum pump or in internal combustion engine.

The use of the system 10 to reduce brake creep groan advantageously allows changes to the brake linings, vehicle suspension or steering without interruption of the system 10.

Furthermore, using the pressure generating device in the form of a linear actuator 20 allows the braking system 10 to function for hybrid/electrical regeneration by not actually applying the calipers 82 to the rotors 83 since the braking system modulates the caliper pressure and allows the generators to decelerate the vehicle. Thus, this allows the re-generators (not shown) to spin backwards and capture energy. Outside of driver braking, the pressure generating device such as a linear actuator 20 allows fast-brake and permits autonomous braking functions like Adaptive Cruise Control or Autonomous Emergency Braking.

The operations and algorithms described herein can be implemented as executable code within the processor circuit 80 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit causes the integrated circuit(s) implementing the processor circuit 80 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 85 can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A vehicle brake system for a vehicle having front and rear wheel brakes, each brake including a caliper associated with a rotor, the system comprising:
   a master cylinder constructed and arranged to be activated by a brake pedal to which the wheel brakes are connected,
   an electrically controllable pressure generating device constructed and arranged to deliver a brake system pressure, wherein the front wheel brakes include a first front wheel brake and a second front wheel brake and the rear wheel brakes include a first rear wheel brake and a second rear wheel brake with each wheel brake including a caliper and a corresponding rotor,
   a plurality of valves fluidly coupled between the calipers and the master cylinder, and
   a control unit having a processor circuit constructed and arranged to determine if the vehicle is operating under a condition where brake noise occurs,
   wherein, when the vehicle is determined by the processor circuit to be operating under a condition where brake noise occurs and when the brake pedal is actuated, the control unit is constructed and arranged to control the pressure generating device and one or more of the valves to selectively modulate caliper pressure by supplying pressure or releasing pressure to at least two of the calipers to reduce the brake noise, while ensuring braking of the vehicle, and
   wherein the at least two calipers comprise the caliper of the first front wheel brake and the caliper of the first rear wheel brake, and the system further comprises at least one sensor communicatively coupled to the processor circuit and constructed and arranged to obtain data indicating if the rotors of the front and rear wheel brakes are at least one of static and at a first drive off condition when the front and rear wheel brakes are cold and wherein the processor circuit determines that the vehicle is operating under the condition where brake noise occurs based upon one of the rotors being static and at a first drive off condition when the front and rear wheel brakes are cold and the electrically controllable pressure generating device is configured to delay a release of pressure to the caliper of the first front wheel brake and the caliper of the first rear wheel brake relative to releasing pressure to the caliper of the second front wheel brake and the second rear wheel brake.

2. The system of claim 1, wherein the control unit includes a memory circuit constructed and arranged to store data regarding conditions when brake noise occurs in the vehicle, the memory circuit being communicatively coupled to the processor circuit such that the data is accessible thereto.

3. The system of claim 2, wherein the processor circuit compares the data obtained by the at least one sensor with the data stored in the memory circuit and determines that the vehicle is operating under a condition where brake noise occurs based on the comparison.

4. The system of claim 1, further comprising a travel simulator fluidly coupled between the master cylinder and the calipers to provide brake pedal feel to the driver of the vehicle and to isolate the calipers from the driver's engagement of the brake pedal.

5. The system of claim 1, wherein the processor circuit is constructed and arranged to control the at least two calipers.

6. The system of claim 1, wherein the the at least two calipers are disposed in diagonal relation.

7. The system of claim 1, wherein the pressure generating device is a linear actuator.

8. The system of claim 1, wherein the pressure generating device is a vacuum source.

9. The system of claim 1, further comprising at least one sensor constructed and arranged to obtain data regarding the brake noise, the sensor being electrically connected with the processor circuit.

10. The system of claim 1, wherein the processor circuit comprises at least one of a microprocessor circuit, programmable logic array, field programmable gate array and application specific integrated circuit, and the control unit further comprises a memory circuit communicatively coupled to the processor circuit, the memory circuit comprising at least one of volatile memory and nonvolatile memory.

11. A method of reducing brake noise in a vehicle brake system having front and rear wheel brakes, with the front wheel brakes including a first front wheel brake and a second front wheel brake, the rear wheel brakes including a first rear wheel brake and a second rear wheel brake and each wheel brake comprising a caliper and a corresponding rotor, a master cylinder activated by a brake pedal to which the wheel brakes are connected, an electrically controllable pressure generating device constructed and arranged to deliver a brake system pressure, and a plurality of valves fluidly coupled between the calipers of the wheel brakes and the master cylinder, the method comprising the steps of:

determining if a vehicle associated with the vehicle braking system is operating under a condition where brake noise occurs, and when the vehicle is determined to be operating under the condition where brake noise occurs and when the brake pedal is actuated by a driver of the vehicle, controlling the pressure generating device and a corresponding number of the plurality of valves to selectively modulate caliper pressure by supplying pressure or releasing pressure to at least two of the calipers to reduce the brake noise, while ensuring braking of the vehicle, wherein the at least two of the calipers comprise the caliper of the first front wheel brake and the caliper of the first rear wheel brake, and the controlling comprising releasing pressure to the calipers, including delaying release of pressure to the caliper of the first front wheel brake and the caliper of the first rear wheel brake relative to releasing pressure to the caliper of the second front wheel brake and to the caliper of the second rear wheel brake.

12. The method of claim 11, further comprising isolating the calipers from the driver when the driver actuates the brake pedal.

13. The method of claim 11, wherein the first front wheel brake and the first rear wheel brake are disposed in diagonal relation to each other about the vehicle.

14. The method of claim 11, wherein the determining step determines whether the vehicle is operating under a condition where brake creep groan occurs.

15. The method of claim 11, further comprising obtaining data indicating at least one of the rotors of the front and rear wheel brakes being static, creeping and at a first drive off condition when the front and rear wheel brakes are cold and determining if the vehicle is operating under the condition where brake noise occurs is based upon the data indicating at least one of the front and rear wheel brakes being static, creeping and at the first drive off condition when the front and rear wheel brakes are cold.

* * * * *